Jan. 23, 1940. P. B. REEVES 2,188,253
CONTROL FOR VARIABLE SPEED DRIVES
Filed Jan. 8, 1938
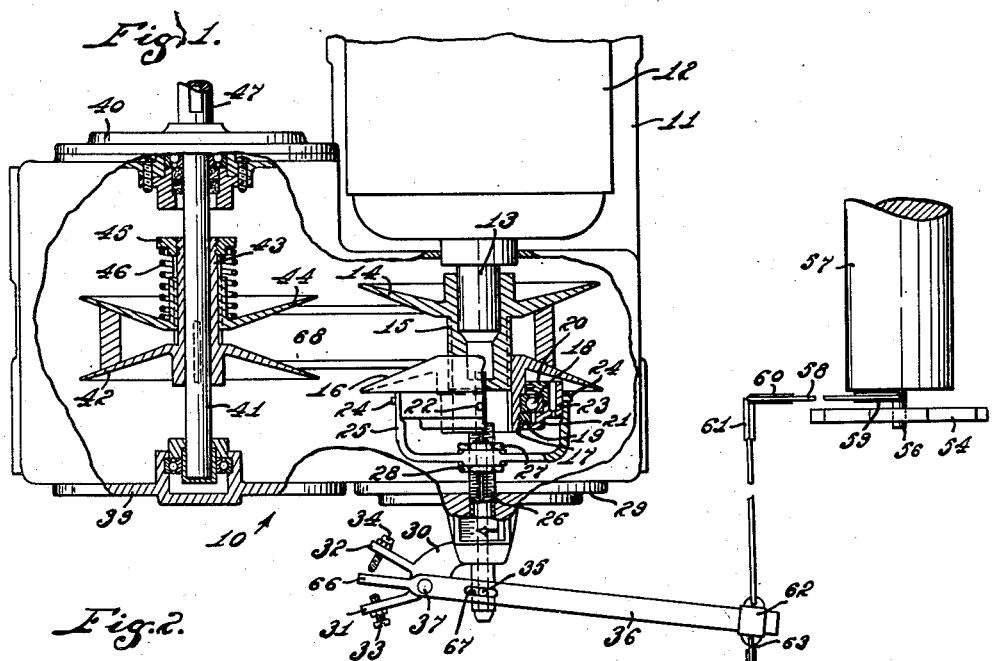
Fig. 1.
Fig. 2.
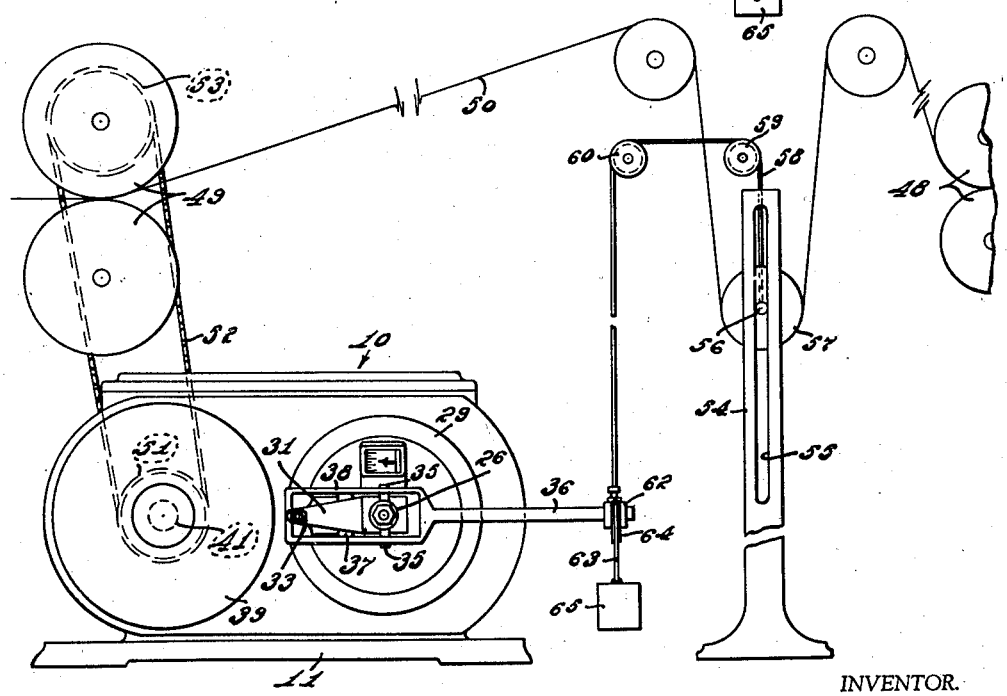
INVENTOR.
Paul B. Reeves,
BY
Hood & Hahn.
ATTORNEYS.

Patented Jan. 23, 1940

2,188,253

UNITED STATES PATENT OFFICE 2,188,253

CONTROL FOR VARIABLE SPEED DRIVES

Paul B. Reeves, Columbus, Ind., assignor to Reeves Pulley Company, Columbus, Ind., a corporation of Indiana Application January 8, 1938, Serial No. 183,969

7 Claims. (Cl. 74—230.17)

The present application relates to a variable speed drive and a control therefor. The primary object of the invention is to provide a novel shifting mechanism for a variable speed drive of the type comprising two expansible pulleys, each comprising a pair of two mating coned discs, one disc of each pulley being fixed to its shaft, and the other disc of one pulley being positively shiftable, while the other disc of the other pulley is spring-urged towards its mate. In the specific embodiment of the invention illustrated, I have shown such a drive, with the novel shifting mechanism incorporated therein, connected to be automatically operated to drive one of two strand-handling rolls to synchronize the effective lineal speeds of said rolls.

While I have specified above the primary object of the present invention, further objects will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan, partly in horizontal section, of a device constructed in accordance with the present invention, parts of the control mechanism being diagrammatically illustrated; and Fig. 2 is a side elevation of the structure illustrated in Fig. 1, further elements of the operated mechanism being diagrammatically illustrated.

Referring more particularly to the drawing, it will be seen that I have illustrated a transmission mechanism enclosed in a housing indicated generally by the reference numeral 10. The base 11 of said housing supports a motor 12, which is not enclosed in the housing, in such a position as to project the spindle 13 of said motor into the housing.

Upon said spindle 13, and within the housing, there is fixed a coned disc 14 provided with an elongated hub 15 projecting axially from its coned face. Axially reciprocably mounted upon said hub 15 is a mating coned disc 16 provided with a hub 17. An anti-friction thrust bearing 18 is mounted upon said hub 17, the inner face of said bearing being secured on said hub between a shoulder formed on the hub and a collar 19 threadedly secured to the hub. The bearing and collar are enclosed in a two-part housing 20, 21 of generally cylindrical outer contour.

A pair of pins 22 (only one of which is shown) project diametrically oppositely from the bearing housing 20, 21, and secured thereto is an equalizer ring 23. Said equalizer ring is provided with diametrically oppositely projecting pins 24 which are ninety degrees removed from the pins 22; and a yoke 25 has its arms respectively operatively associated with said pins 24.

Said yoke 25 is carried upon a stem 26 which is reciprocably mounted in a suitable bore in a cover plate 29 closing an aperture in said side wall of the housing 10. As is clearly shown in Fig. 1, the yoke 25 is adjustable axially of the stem 26, being secured in place between a pair of nuts 27, 28 threadedly mounted upon said stem.

The cover plate 29 carries, outside the housing 10, a bracket 30 provided with angularly related branches 31, 32. A stop screw 33 is adjustably mounted in the branch 31 and a stop screw 34 is adjustably mounted in the branch 32, said screws cooperating with a finger 66 to control the degree of movement of a lever 36 pivotally mounted upon a pin 37 carried by the bracket 30.

The stem 26 projects through the cover plate 29 and, on its outer end, carries a pin 35 projecting diametrically therethrough. The opposite end projections of the pin 35 are received in slots 67 in the arms of a yoke portion 38 of the lever 36.

The housing 10 is formed with a pair of aligned apertures in its opposite walls, which are closed, respectively, by cover plates 39 and 40, said cover plates carrying bearings which support a shaft 41. A coned disc 42 is fixed to the shaft 41, and is provided with an elongated hub 43 projecting axially from its coned face. A mating coned disc 44 is axially reciprocably mounted upon the hub 43, said discs 42 and 44 cooperating to form an expansible V-pulley. The extremity of the hub 43 carries a stop collar 45 between which and the disc 44 is received a coiled spring 46, constantly urging the disc 44 toward the disc 42.

It will be apparent that, if the lever 36 is moved in a counterclockwise direction from the position illustrated in Fig. 1, the stem 26 will thereby be shifted upwardly to shift the disc 16, through the yoke 25, equalizer ring 23, bearing housing 20, 21, and bearing 18, correspondingly upwardly, as viewed in Fig. 1. The belt 68 will be squeezed outwardly between discs 16 and 14 and will consequently be drawn inwardly more deeply between the discs 42 and 44, thus forcing the disc 44 to move upwardly against the tendency of the spring 46; whereby the speed of the shaft 41 will be increased.

I have illustrated a pair of strand-handling rolls 48 adapted to be driven by a source of power (not shown); and a pair of strand-handling rolls 49, a strand 50 being adapted to be handled by the rolls 48 and 49. A projection 47 of the shaft 41 outside the casing carries a sprocket 51 which, through a chain 52, drives a sprocket 53 on the roll 49.

A strand 54 is formed with a vertical slot 55 in which is guided a shaft 56 carrying a dance roll 57 which is supported in a bight in the strand 50. Obviously, if said bight is shortened by an increase in the lineal speed of the rolls 49 as compared with the rolls 48, the dance roll 57 will be lifted; and conversely, if the bight is elongated by a reduction in the speed of the rolls 49 as compared with the rolls 48, the dance roll 57 will fall. A cable 58 is secured to the shaft 56 and passes over pulleys 59 and 60 and under a pulley 61, and is connected to a bracket 62 secured to the outer end of the lever 36. A second cable 63, likewise secured to the bracket 62, passes over a pulley 64 and supports a weight 65. Obviously, the weight 65 could be replaced by a spring.

The weight 65, or its equivalent, resiliently urges the lever 36 toward movement in a clockwise direction as viewed in Fig. 1, to expand the pulley 14, 16, said element 65 or its equivalent substantially balancing the weight of the dance roll 57. It follows that, if the bight is shortened to elevate the dance roll 57, the element 65 or its equivalent will be permitted to shift the lever 36 in a clockwise direction to expand the pulley 14, 16 to decrease the speed of the shaft 41 and the rolls 49; while, if the bight is elongated to permit the dance roll 57 to move downwardly, the lever 56 will be moved in a counterclockwise direction as viewed in Fig. 1 to contract the pulley 14, 16 to increase the speed of the shaft 41.

I claim as my invention:

1. In a device of the class described, a housing, a shaft rotatably mounted within said housing, an expansible pulley mounted on said shaft and comprising a coned disc fixed to said shaft, and a mating coned disc axially reciprocable with respect thereto, a thrust bearing associated with said last-named disc, a threaded stem slidably reciprocable in said housing, an element carried by said stem and connected with said thrust bearing, means threadedly mounted on said stem and engaging said element to position the same adjustably on said stem, and means for shifting said stem comprising a lever pivotally mounted outside said casing and engaging said stem to reciprocate the same upon oscillation of said lever.

2. In a device of the class described, a housing, a shaft rotatably mounted within said housing, an expansible pulley mounted on said shaft and comprising a coned disc fixed to said shaft, and a mating coned disc axially reciprocable with respect thereto, a thrust bearing associated with said last-named disc, a threaded stem reciprocably mounted in said housing, carrying a yoke slidably mounted on said stem, said yoke being operatively associated with said thrust bearing to shift the same, two nuts threadedly mounted on said stem and engageable with opposite sides of said yoke to hold the same in adjusted position on said stem, and means for shifting said stem comprising a lever pivotally mounted outside said casing and engaging said stem to reciprocate the same upon oscillation of said lever.

3. In a device of the class described, a housing, a shaft rotatably mounted within said housing, an expansible pulley mounted on said shaft and comprising a coned disc fixed to said shaft and a mating coned disc axially shiftable with respect thereto, a stem reciprocably mounted in said housing substantially in axial alignment with said shaft, means including a lever pivotally mounted on a stationary axis for reciprocating said stem, and means providing an operative connection between said stem and said shiftable disc, said last-named means comprising an element mounted on said stem for axial adjustment with respect thereto.

4. In a device of the class described, a housing, a shaft rotatably mounted within said housing, an expansible pulley mounted on said shaft and comprising a coned disc fixed to said shaft and a mating coned disc axially shiftable with respect thereto, an aperture formed in said housing adjacent said shiftable disc, a cover plate for said aperture, a stem axially reciprocable in said cover plate and projecting outwardly therefrom, means providing an operative connection between said stem and said shiftable disc, a bracket carried by the outer surface of said cover plate and having a portion disposed out of coaxiality with said stem, a lever pivotally mounted upon said bracket portion and formed with a slot, and a pin carried by the projecting portion of said stem and engaged in said slot.

5. In a device of the class described, a housing, a shaft rotatably mounted within said housing, an expansible pulley mounted on said shaft and comprising a coned disc fixed to said shaft and a mating coned disc axially shiftable with respect thereto, an aperture formed in said housing adjacent said shiftable disc, a cover plate for said aperture, a stem axially reciprocable in said cover plate and projecting outwardly therefrom, means providing an operative connection between said stem and said shiftable disc, a bracket carried by said cover plate and having a portion disposed out of coaxiality with said stem and outwardly beyond the outermost surface of said cover plate, said bracket being further formed with two angularly related fingers, a lever pivotally mounted upon said bracket portion, said lever being formed with a toe disposed between said bracket fingers, and with a slot, and a pin carried by the projecting portion of said stem and engaged in said slot.

6. In a device of the class described, a housing, a shaft rotatably mounted within said housing, an expansible pulley mounted on said shaft and comprising a coned disc fixed to said shaft and a mating coned disc axially shiftable with respect thereto, an aperture formed in said housing adjacent said shiftable disc, a cover plate for said aperture, a stem axially reciprocable in said cover plate and projecting outwardly therefrom, means providing an operative connection between said stem and said shiftable disc, a bracket carried by said cover plate and having a portion disposed out of coaxiality with said stem and outwardly beyond the outermost surface of said cover plate, said bracket being further formed with two angularly related fingers, an adjustable stop screw carried by each of said fingers and projecting toward the other finger, a lever pivotally mounted upon said bracket portion, said lever being formed with a toe disposed between said screws, and with a slot, and a pin carried by the projecting portion of said stem and engaged in said slot.

7. In a device of the class described, a housing, a shaft rotatably mounted within said housing, an expansible pulley mounted on said shaft and comprising a coned disc fixed to said shaft and a mating coned disc axially shiftable with respect thereto, an aperture formed in said housing adjacent said shiftable disc, a cover plate for said aperture, a stem axially reciprocable in said cover plate and projecting outwardly therefrom, means providing an operative connection between said stem and said shiftable disc, a bracket carried by the outer surface of said cover plate and having a portion disposed out of coaxiality with said stem, a lever having a yoke portion, pivot means carried by said bracket portion and engaged by said lever yoke portion to support said lever, the arms of said lever yoke portion further being formed with registering slots, and pin means carried by the projecting portion of said stem and engaged in said slots.

PAUL B. REEVES.